INVENTORS
KAZUO YAMAGISHI
OSAMU KAGEYAMA
YOSHIAKI NUMA
BY Woodhams, Blanchard & Flynn
ATTORNEYS

United States Patent Office

3,663,574
Patented May 16, 1972

3,663,574
PROCESS FOR THE CONTINUOUS PRODUCTION OF PROPYLENE OXIDE
Kazuo Yamagishi, Tokyo, and Osamu Kageyama and Yoshiaki Numa, Ohimachi, Saitama, Japan, assignors to Daicel Ltd., Osaka, Japan
Filed May 12, 1969, Ser. No. 823,605
Claims priority, application Japan, May 11, 1968, 43/31,513
Int. Cl. C07d 1/12
U.S. Cl. 260—348.5                          7 Claims

ABSTRACT OF THE DISCLOSURE

Propylene oxide is produced by incorporating bubbles of propylene gas at a pressure in the range of 3–50 kg./sq. cm. gauge into an organic solvent solution of peracetic acid and forwarding the reactants in concurrent flow through a series of reaction zones separated by perforate members whose perforations have a diameter in the range of 2 to 10 mm. and a perforation ratio of 1 to 20%. The flow rate of the solution is less than 2000 in Reynolds number and the superficial velocity of the propylene bubbles is in the range of 0.05–50 cm./sec. The temperature in the reaction system is in the range of 30° C. to 80° C. and the mean residence time of the reactants in the reaction system is in the range of 30 to 180 minutes.

DESCRIPTION OF THE PRIOR ART

The epoxidation of olefins by organic peracids is known by, e.g., the report of J. Sturman et al. on the preparation of propylene oxide by the oxidation of propylene with peracetic acid (cf. J. Sturman et al. "Proc. Acad. Sci. Amsterdam"; 38, 450 (1935)).

However, because such an epoxidation reaction is generally accompanied by the generation of a large amount of heat and also because the peracetic acid used in this reaction is sensitive to heat as well as being a very unstable compound, various troubles will occur during the reaction, which result in reducing the yield of the desired product.

As a method of producing propylene oxide, there is known a method wherein the reaction of propylene and peracetic acid is conducted by blowing propylene gas at atmospheric pressure into a peracetic acid solution which is being stirred in a reactor, but such conventional method has the defects that not only is the rate of the reaction too low to enable the method to be used practically for an industrial purpose, but also, undesirable side reactions tend to occur, which will lower the yield of the desired product. Therefore, in order to increase the rate of the reaction, there has been generally employed a method in which the reaction of propylene is carried out under pressure by introducing liquefied propylene into a peracetic acid solution. However, by simply conducting the reaction under pressure as mentioned above, the rate of reaction may be increased but the occurrence of side reactions will not be prevented.

The side reactions are reactions which involve forming high boiling materials, such as propylene glycol monoacetate and di-acetate, by the successive reactions between the propylene oxide formed by the main reaction and acetic acid. Hence, the side reactions consume the desired product and reduce the yield of said product and, therefore, must be avoided. In order to avoid the occurrence of such successive side reactions, it has been considered to be advantageous to maintain the liquid flow in the reaction system in a state of piston flow and terminate the reaction prior to the occurrence of side reactions.

Based on this consideration and in view of the fact that the removal of heat is necessary in such an exothermic reaction wherein the aforesaid unstable peracetic acid is used, various processes for carrying out the epoxidation reaction have hitherto been proposed.

For example, British Pat. No. 1,076,288 discloses a method wherein, in the production of an olefin oxide by introducing a liquefied olefin into a peracetic acid solution in a column-type reactor and conducting liquid phase oxidation under pressure, the rate of the reaction is improved by conducting the reaction in two steps and controlling the reaction temperature and reaction period of time in each step. However, this method is lacking in the consideration for the removal of the heat of reaction and is not suitable for large-scale industrial practice. Furthermore, Japanese patent publication No. 28,228/1964 (British Pat. No. 858,793) provides a method wherein the reaction of an ethylenic unsaturated compound and peracetic acid is carried out under a high pressure sufficient for maintaining the reactants in a liquid phase in a reactor having such a large heating surface area that the ratio of the diameter of the reaction column to the length of the reaction column will be from 1:100 to 1:10,000 while maintaining the flow of the reaction liquid in a state of piston flow. However, this method requires the employment of a very elongated reaction column or a multiple tube-type reactor composed of a number of such elongated reaction columns bound together. Thus, there are such disadvantages that the apparatus becomes complicated when the method is practiced on an industrial scale and, also, since the aforesaid side reactions may still occur in this procedure, the residence time of the reaction liquid must not exceed 45 minutes.

SUMMARY OF THE INVENTION

Therefore, an object of the present invention is to provide a process for the production of an epoxy compound with a good yield without the above-mentioned accompanying various defects or disadvantages, in particular, by greatly reducing the formation of side reaction products even if the reaction is continued until the peracetic acid supplied in the reaction system is almost completely consumed.

According to the present invention, there is provided a process for the continuous production of propylene oxide in which an organic solvent solution of peracetic acid is introduced into a reaction system. The reaction system is composed of a plurality of communicating reaction zones provided by partitioning a reaction column into said plurality of reaction zones by means of a plurality of partition plates which are capable of passing the reaction liquid therethrough and/or by connecting a plurality of reaction columns in series. Propylene is introduced into one end of the reaction system under a pressure which is higher than 3 kg./sq. cm. gauge so that the propylene is present as bubbles thereof in each reaction zone at the reaction temperature. The reaction liquid is passed through each reaction zone to cause the reaction while preventing the flow of the reaction liquid from being remarkably disturbed by the bubbles at the connecting sections between adjacent reaction zones and also sufficiently stirring the reaction liquid by the bubbles of propylene in each reaction zone. The reaction product thus obtained is withdrawn from the other end of the reaction system.

In the process of this invention, the use of a cylindrical reactor is quite desirable because a cylindrical reactor has a sufficient wall area for removing effectively the heat of the reaction by the use of a conventional inside or outside cooling means. Also, the reaction liquid passing therethrough can be easily and effectively stirred by the blowing of bubbles to effect sufficiently the vapor-liquid contact. Also, in the process of this invention, such a reactor may be employed alone or a plurality of such reactors connected in series may be employed. These systems may be selected desirably if the residence time of the reaction liquid passing through the reaction column can be sufficiently maintained in connection with the length of the reaction column or columns and the flow rate of the reaction liquid for obtaining a high rate of reaction.

By the process of the present invention, the reaction of propylene and peracetic acid is conducted by blowing propylene, in the form of bubbles, into a peracetic acid solution passing through a reaction column to stir sufficiently the flowing reaction liquid by the bubbles, whereby vapor-liquid contact is effected. Further, the reaction system for the process of this invention may be composed of a plurality of reaction zones formed in one reaction column partitioned by partition plates, such as perforated plates, or may be composed of a plurality of reaction columns connected to each other in series by means of conduits. In the latter case, each of said reaction columns may be partitioned into a plurality of reaction zones or it may be a single reaction zone.

Thus, the reaction liquid passes through each reaction zone successively in a definite direction while effecting the vapor-liquid reaction in each reaction zone. The reaction liquid is transferred successively to the next following reaction zone in which the reaction liquid composition has a higher concentration of the reaction product. The reaction liquid is finally withdrawn from the last reaction zone as a crude product.

In the process of this invention, propylene must be blown into the reaction system in the form of bubbles as mentioned above. Therefore, the pressure in the reaction column must be maintained lower than the vapor pressure of propylene and, also, it is desiarble to prevent the reduction of the rate of the reaction of the passing liquid that the partial pressure of propylene is increased. For the purpose, it is necessary to conduct the blowing in of the propylene at a pressure lower than 50 kg./sq. cm. gauge, under which propylene is not liquefied, and higher than 3 kg./sq. cm. gauge.

As mentioned above, in the process of this invention, the vapor-liquid contact is conducted under pressure by employing a cylindrical reactor in the aforesaid specific manner which has never been practiced in conventional methods of producing propylene oxide from propylene and peracetic acid. Therefore, the process of this invention is quite advantageous from the viewpoint of constructing an industrially practical apparatus and also can be operated very easily as compared with conventional methods. In particular, by employing the vapor-liquid contact process for propylene and a peracetic acid solution under pressure in the above specific conditions in accordance with the process of this invention, the reaction liquid can be retained for a sufficient residence period of time in the reaction zone until the peracetic acid is almost completely consumed without substantially reducing the rate of the reaction in the reaction system as well as effectively preventing the occurrence of undesirable side reactions. Therefore, the economic and industrial merits of the process of this invention are quite large.

Peracetic acid is used in the present invention as a solution in an inert organic solvent, as is conventional. Organic acid esters such as methyl acetate and ethyl and ethyl acetate, ketones such as acetone, and hydrocarbons such as benzene can be used as such inert organic solvents. The peracetic acid concentration in the solution should be less than 45% by weight from the viewpoint of its heat stability and its optimum concentration is in the range of 20% to 45%. The peracetic acid solution can contain a small amount of acetic acid, but, if the acetic acid concentration is too high, it will cause the esterification of propylene oxide, which will lower the yield of propylene oxide. Thus, it is preferable to make the acetic acid concentration in the peracetic acid solution less than 20% by weight.

In the practice of the present invention, the molar ratio of propylene to peracetic acid should be maintained in the range of 1 to 6:1, preferably in the range of 1.2 to 5:1, since the bubbles of propylene should be maintained under the reaction conditions and the agitation of the reaction solution should be effected by said bubbles. If the reaction temperature is made too high, it will cause the decomposition of peracetic acid, which will make the control of the reaction difficult. On the other hand, if the temperature is too low, the residence time will become too long, which will make the volume of reactor to be used too large. The reaction temperature can be in the range of 30 to 80° C. and, preferably, it should be in the range of 40 to 70° C. The mean residence time under such reaction temperatures can be in the range of 30 to 180 minutes, and preferably, it should be in the range of 60 to 150 minutes.

Although the invention is not limited to the specific embodiments of apparatus and the operative conditions described below, the invention will be explained more concretely by reference to the embodiments shown in accompanying drawings, in which.

Figure 1:
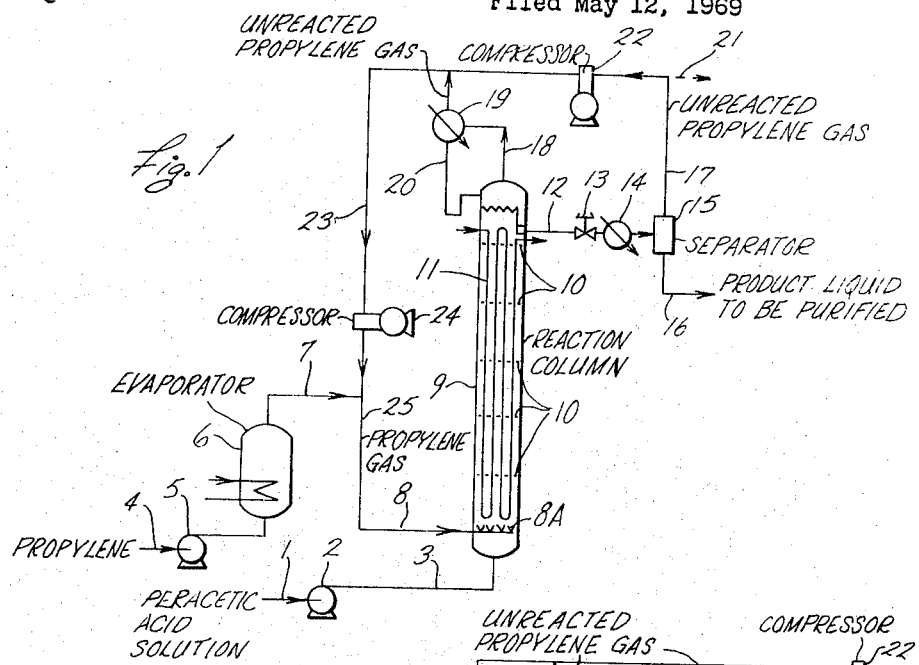
FIG. 1 is a flow diagram showing one embodiment of the process of this invention.

Referring to FIG. 1, a peracetic acid solution is supplied to a pump 2 through a conduit 1 and, after being pressurized by the pump, is introduced through a conduit 3 into the bottom of a reaction column 9. The reactor is cylindrical and contains, as shown in FIG. 1, a plurality of substantially horizontal, vertically spaced perforated plates 10 and a heat-exchange tube 11 for removing the heat of the reaction. The heat-exchange tube 11 may be replaced with or used together with an external cooling jacket if necessary. Propylene is fed into an evaporator 6 through a conduit 4 by means of a pump 5. Gaseous propylene evaporated in the evaporator 6 is fed through a conduit 7 to a conduit 25. In the conduit 25, the gaseous propylene is mixed with a circulating gas circulated by means of a compressor or blower 24. The gas mixture is blown into the peracetic acid solution in the reaction column 9 through a conduit 8 by means of a gas inlet pipe 8A provided at the bottom of the reaction column 9. Thus, propylene gas is fed into the peracetic acid solution in the form of bubbles thereof. While the peracetic acid solution flows upwardly through the reaction column, the bubbles of propylene are redispersed by the perforated plates 10 as said bubbles rise through the reaction column. Therefore, a sufficient vapor-liquid contact can be obtained in each reaction zone and the expoxidation reaction can be effectively and successively conducted in the reaction zones.

Furthermore, it is desirable to adjust the supply of the peracetic acid solution and propylene so as to stir or agitate sufficiently the reaction liquid and to maintain the contact of the reactants effectively during the passage of the reaction liquid through the reaction column. According to our experiments, it has been confirmed that these desired results can be attained by maintaining the flow rate of the peracetic acid solution at an extremely slow rate of less than 2,000 in Reynolds number and by maintaining the superficial gas velocity of the propylene bubbles in the column within the range of 0.05–50 cm./sec. As mentioned above, by passing the reaction liquid through the reaction column at a flow rate lower than the aforesaid Reynolds number value and within a range in which the flow of the reaction liquid itself in the whole reaction system is maintatined in a laminar flow state, the reaction liquid is retained in the reaction system for a sufficient residence time for reacting peracetic acid and propylene until the peracetic acid is almost completely consumed in the reaction system. Thus, the conversion rate of the peracetic acid can be improved. The diameter of the bubbles of propylene to be blown into the reaction system depends on the dimension of the diameter of the reaction column to be used. But in order to obtain a good contact between the peracetic acid solution and the bubbles of propylene, it is preferable that the diameter of the bubbles should be relatively small. The diameter of each nozzle and the number of nozzles in the bubble inlet pipe 8A are preferably so defined that the diameter of the bubbles is usually less than 10 mm., preferably 1–5 mm., and the orifice Reynolds number is less than $10^7$, preferably in the range $10^6$–$10^4$.

As the bubble inlet pipes 8A or bubble blowoff pipes, there can preferably be used a straight pipe or a ring-shaped pipe which has several rows of small holes or nozzles opened at an appropriate pitch thereon so that the above-mentioned conditions can be satisfied. The bubble inlet pipe 8A is located in the bottom part of the reaction column.

If the superficial gas velocity of the propylene gas becomes less than 0.05 cm./sec., it becomes difficult to maintain the reaction liquid in a sufficiently turbulent state in each reaction zone, while if the superficial gas velocity is higher than 30 cm./sec., a normal contact state cannot be obtained. In either case, side reactions such as decomposition of peracetic acid occur and the selectivity of the desired product is lowered.

Moreover, the peracetic acid solution flows upwardly through the reaction column while being contacted with propylene in each reaction zone partitioned by the perforated plates 10. For suppressing the occurrence of a back mixing phenomenon of the reaction liquid and conducting the reaction while maintaining the whole reaction system in a laminar flow state, it is desirable to provide a plurality of perforated plates 10, each plate having hole diameters of 2–10 mm., preferably 4–6 mm., and a perforation ratio of 1–20%, preferably 5–15%. The plates 10 are placed in the reaction column 9 with substantially the same vertical spacings between adjacent plates. The term "perforation ratio" refers to the ratio of the sum of the areas of the holes to the area of the plate. For example, we have conducted the reaction of this invention by dividing the reaction column 9 into six reaction zones by inserting five perforated plates 10 having hole diameter of 5 mm. and a perforation ratio of 10% as shown in FIG. 1. This provided the effect of redispersing the propylene bubbles in the peracetic acid solution and confirmed that the yield of propylene oxide could be increased while suppressing the formation of propylene glycol monoacetate, etc., which would otherwise be caused by the side reaction between the propylene oxide formed and acetic acid.

The reaction product liquid thus formed flows out through a conduit 12 and then, after reducing the pressure of the reaction product liquid to atmospheric pressure in a reducing valve 13 and cooling it to ambient temperature or lower in a condenser 14, the reaction product liquid is introduced in a propylene separator 15, wherein the unreacted and undissolved propylene is removed through a conduit 17 in gaseous state and the liquid product is withdrawn through a conduit 16 to be processed in a purification step. The gaseous propylene separated in the separator 15 may be withdrawn through a conduit 21 or may be compressed in a compressor 22 and recycled into the reaction system through a conduit 23.

Furthermore, the unreacted propylene gas rising as bubbles to the top of the reaction column 9 is separated from the liquid phase there and is introduced into a condenser 19 through a conduit 18. In the condenser 19, the propylene gas is separated from the small amount of liquid, if any, carried by the gas. The liquid thus separated is returned into the reaction column 10 through a conduit 20 and the propylene gas is sent to the compressor 24 together with the propylene gas from the compressor 22 through a conduit 23 to be recycled to the reaction. That is, these propylene gases are compressed in the compressor 24 and introduced into the reaction column through the conduit 8 together with the fresh propylene gas fed through the conduit 7.

Figure 2:
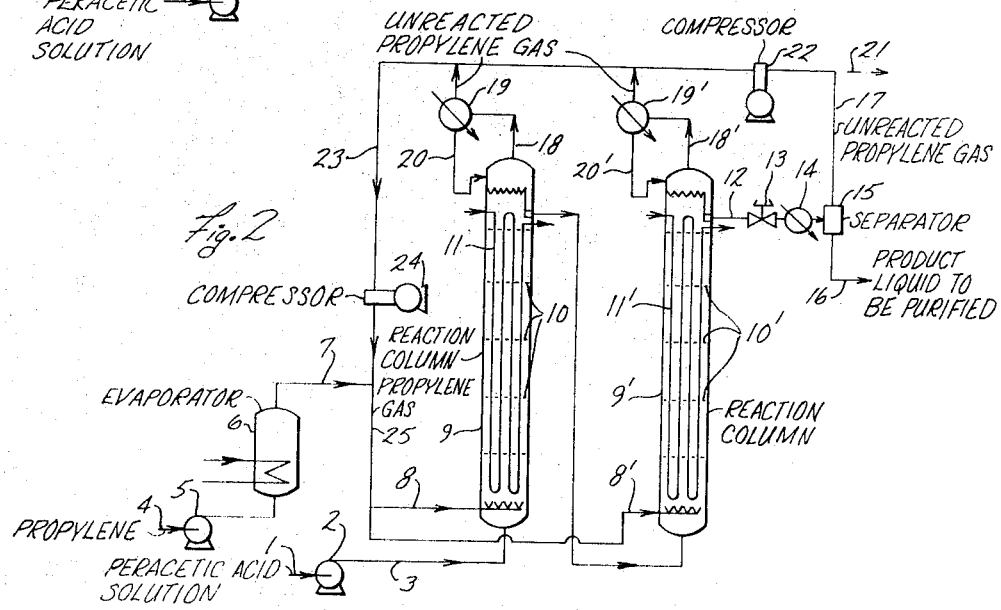
FIG. 2 is a flow diagram showing a second embodiment of this invention.

FIG. 2 is a flow sheet showing an embodiment of the present invention wherein two reaction columns 9 and 9', like the one shown in FIG. 1 are connected in series. The embodiment shown in FIG. 2 has the advantages that the reaction conditions can be properly controlled in each reaction column and, also, the residence time for the reaction liquid can be prolonged to improve sufficiently the conversion rate of the peracetic acid. The procedure of the embodiment shown in FIG. 2 is carried out in substantially the same manner as the one explained in regard to the embodiment shown in FIG. 1. The parts of the reaction column 9 in FIG. 2 corresponding to those of the reaction column 9 in FIG. 1 are indicated by the same numerals. The parts of the second reaction column 9' corresponding to the same parts of the reaction column 9 in FIG. 1 are indicated by the same numerals with a prime mark added.

Figure 3:
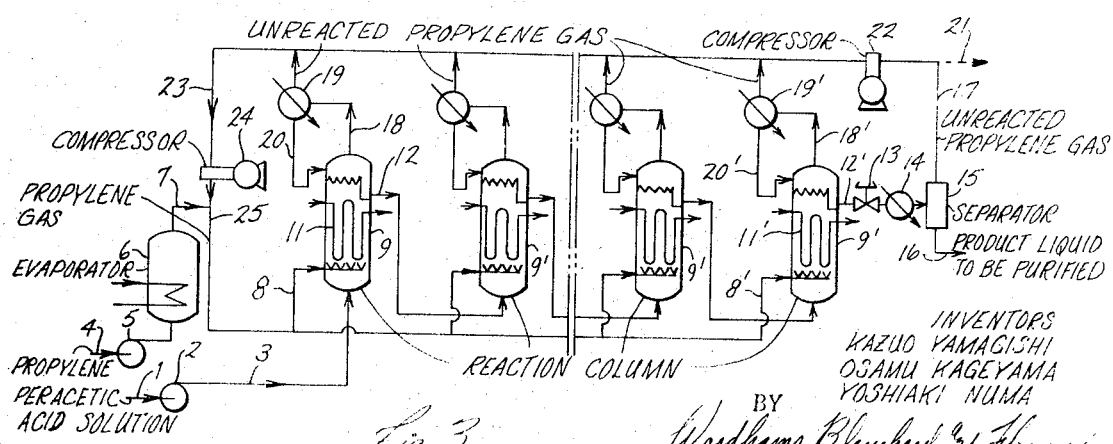
FIG. 3 is a flow diagram showing a still other embodiment of this invention.

FIG. 3 is a flow sheet showing another embodiment of the present invention wherein a plurality of reactors 9 and 9', each of which constitutes a single reaction zone as mentioned above, are connected in series. By directly connecting a plurality of reaction zones by means of conduits to provide a complete reaction system, the reaction can be conducted by piston flow system. This type of embodiment is very advantageous since the apparatus can be easily constructed, the occurrence of side reactions as a result of a back mixing phenomenon can be suppressed and the residence time for the reaction liquid can be desirably and easily controlled corresponding to the control of the flow rate of the reaction liquid. The structure of each reactor 9 and the operation of the system in FIG. 3 are substantially the same as the ones of each single reaction zone shown in FIGS. 1 and 2 and will be understood easily by referring to the procedure described in regard to the embodiment shown in FIG. 1.

In the case of practicing the embodiment shown in FIG. 3, four or more reactors are usually employed. The numerals and the prime-added numerals in FIG. 3 are the same as in the case of FIG. 2 and FIG. 1.

The merits of the process of this invention will become apparent by the following examples. In these examples all percentages are by weight.

Example 1

The preparation of propylene oxide was conducted using one reaction column as shown in FIG. 1 of the accompanying drawings.

The reaction column was composed of a stainless steel pipe having a diameter to length ratio of 1 to 33, having a jacket for controlling the temperature of the reaction ssytem by ciriculating warm water through it, and the inside of the reaction column was divided into four reaction zones by three perforated plates having hole diameters of 5 mm. and a perforation ratio of 10%. The pressure in the reaction column was maintained at 10 kg./sq. cm. gauge by means of a control valve coupled to the outlet of the reaction column. While circulating water of 50° C. through the jacket, a peracetic acid solution consisting of 15.5% peracetic acid, 12.0% acetic acid, and 72.5% ethyl acetate was supplied to the bottom of the reaction system at a rate of 678 parts per hour. Liquid propylene having a purity of 92% and containing a small quantity of propane was evaporated in an evaporator at a rate of 256 parts per hour and, after preheating the propylene gas, the gas was blown into the reaction liquid as uniformly dispersed bubbles thereof through a gas inlet or bubble blowoff pipe provided at the bottom of the reaction column and having three holes of 0.7 mm. in diameter. The superficial gas velocity of the propylene gas was 0.1 cm./sec. The mean residence time of the reaction liquid in the system was 60 minutes. Under these conditions, the reaction liquid in each reaction zone or chamber was stirred sufficiently by the bubbles of propylene gas and hence a uniform temperature was easily established throughout the whole reaction zone and also temperature control could be easily effected. The pressure of the reaction product withdrawn from the top of the reaction column was converted to atmospheric pressure by a control valve, and then the reaction product was supplied to a falling-film type evaporator to release propylene dissolved in the reaction product and at the same time the liquid reaction product was recovered at a rate of 706 parts per hour. The liquid product thus recovered contained 7.1% peracetic acid, 4.8% propylene oxide, 0.03% propylene glycol monoacetate, and a very slight amount of high boiling esters. The propylene oxide accompanied with unreacted propylene was recovered by absorbing it into butanol in an absorption column packed with Raschig rings. The conversion rate of the peracetic acid was 52.0% and the yield of the propylene oxide based on the peracetic acid reacted was 91.0%.

Example 2

The inside pressure of the same reaction column as in Example 1 was adjusted to 10 kg./sq. cm. gauge and water at 70° C. was circulated through the jacket. A peracetic acid solution consisting of 27.7% peracetic acid, 12.5% acetic acid, and 59.8% ethyl acetate was supplied to the bottom of the reaction column at a rate of 701 parts per hour and propylene having a purity of 92% was evaporated at a rate of 360 parts per hour and, after preheating, it was blown into the reaction system as bubbles. The superficial gas velocity was 0.5 cm./sec. and the mean residence time of the reaction liquid was 59 minutes. The pressure of the product withdrawn from the top of the reaction column was converted to atmospheric pressure and, thereafter, by separating the unreacted propylene, the liquid product was recovered with a rate of 775 parts per hour. The liquid product contained 4.1% peracetic acid, 13.7% propylene oxide, and 0.15% propylene glycol monoacetate. The conversion rate of the peracetic acid was 83.8% and the yield of propylene oxide based on the reacted peracetic acid was 97.2%.

Example 3

The inside pressure of the reaction column as used in Example 1 was maintained at 10 kg./sq. cm. gauge and water at 70° C. was circulated through the jacket. A peracetic acid solution consisting of 28.2% peracetic acid, 12.3% acetic acid, and 59.5% ethyl acetate was supplied to the bottom of the reaction column at a rate of 345 parts per hour and propylene of 92% purity was evaporated at a rate of 163 parts per hour and, after preheating, it was blown into the bottom of the reaction system as bubbles thereof. The superficial gas velocity of the propylene gas was 0.2 cm./sec. and the mean residence time of the reaction liquid in the column was 121 minutes. The pressure of the reaction product withdrawn from the top of the reaction column was converted to atmospheric pressure and, thereafter, by separating the unreacted propylene, the liquid product was recovered with a rate of 381 parts per hour. The liquid product thus recovered contained 2.6% peracetic acid, 13.4% propylene oxide, and 0.29% propylene glycol monoacetate. The conversion rate of peracetic acid was 90.1% and the yield of propylene oxide based on the reacted peracetic acid was 90.4%.

Example 4

According to the embodiment shown in FIG. 2 using two reaction columns, the preparation of propylene oxide was conducted. Each of the reaction columns was composed of a stainless steel pipe having a jacket and a diameter to length ratio of 1 to 33 as in Example 1, but the inside of the column was divided into ten reaction zones by nine perforated plates. The pressure of the inside of each reaction column was maintained at 7 kg./sq. cm. gauge and water at 50° C. was circulated through the jacket of the first reaction column, while water at 65° C. was circulated through the jacket of the second reaction column. A peracetic acid solution consisting of 30% peracetic acid, 13% acetic acid and 57% ethyl acetate was supplied to the bottom of the first reaction column at a rate of 680 parts per hour and the reaction liquid withdrawn from the top of the first reaction column was supplied to the bottom of the second reaction column. Propylene of 92% purity was blown into the bottom of each reaction column as uniformly dispersed bubbles at a superficial gas velocity of 0.1 cm./sec. The mean residence time of the reaction liquid in each reaction column was 60 minutes. After converting the pressure to atmospheric pressure by a control valve, the reaction product withdrawn from the top of the second reaction column was supplied to a falling-film type evaporator, wherein the unreacted propylene was separated and at the same time the liquid product was recovered. The propylene oxide accompanied with the unreacted propylene was recovered by being absorbed by butanol. The temperatures of the outlets of the first and second reaction columns were 52° C. and 66° C., respectively, and the temperatures could be easily controlled. The conversion rate of peracetic acid was 96.7% and the yield of propylene oxide based on the reacted peracetic acid was 92.0%.

Example 5

The pressures of the same two reaction columns as those used in Example 4 were maintained at 9 kg./sq. cm. gauge and water at 55° C. was circulated through the jacket of the first reaction column, while water at 65° C. was circulated through the jacket of the second reaction column. A 30% peracetic acid solution having the same composition as that used in Example 4 was supplied to the bottom of the first reaction column at a rate of 1360 parts per hour and the mean residence time of the reaction liquid was reduced to 30 minutes in each column. Propylene of 92% purity was separately supplied to the bottom of each reaction column as bubbles thereof at a superficial gas velocity of 0.1 cm./sec. The temperatures of the outlets of the reaction columns were 59° C. and 66° C., respectively. The conversion rate of the peracetic acid was 93.1% and the yield of propylene oxide based on the reacted peracetic acid was 93.5%.

Example 6

According to the embodiment shown in FIG. 2, the preparation of propylene oxide was conducted by using two reaction columns each having a large diameter and contained therein a heat-exchange tube. Each reaction column was composed of a jacket-equipped stainless steel pipe having a diameter to length ratio of 1 to 13 and the column was divided into six reaction zones by five perforated plates. Water at 40° C. was circulated through the jacket and the heat-exchange tube of each reaction column and the inside pressure of each reaction column was maintained at 10 kg./sq. cm. gauge. A peracetic acid solution was supplied to the bottom of the first reaction column, the reaction product withdrawn from the top of the first column was introduced into a vapor-liquid separator, wherein gaseous propylene was separated, the liquid component was continuously introduced into the bottom of the second reaction column as it was. The composition of the peracetic acid solution was 34% peracetic acid, 10% acetic acid, and 56% ethyl acetate. The mean residence time of the reaction liquid in each column was 60 minutes. Propylene of 92% purity was separately blown into each reaction column as uniformly dispersed bubbles thereof from the gas inlet provided at the bottom of the reaction column at a superficial gas velocity of 5 cm./sec. After converting the pressure of the reaction product withdrawn from the top of the second reaction column to atmospheric pressure, the unreacted propylene was separated from the product and the liquid product was recovered. The propylene oxide accompanied with the unreacted propylene was recovered in an absorption column. The temperatures of the outlets of the reaction columns were maintained at 64° C. and 66° C., respectively, and, also, it was confirmed that the temperature could be very easily controlled even in a reactor having a relatively large diameter thanks to the stirring effect of the bubbles in each reaction zone. Moreover, since the mixing of the reaction liquids in the adjacent reaction zones or chambers was prevented by the presence of the perforated plates, a high reaction efficiency was obtained. The conversion rate of peracetic acid against the reaction product withdrawn from the second reaction column was 98.8% and the yield of the propylene oxide based on the reacted peracetic acid was 91.4%.

For comparison, the same reaction was conducted by using the same reaction columns under conditions in which no bubbles of propylene were formed by reducing the proportion of propylene below the amount able to be dissolved under the reaction conditions, but the temperature in the reaction column increased and, hence, it was impossible to continue normal operation.

What is claimed is:

1. A process for the continuous production of propylene oxide, which comprises:

continuously feeding into one end of a reaction system a solution of peracetic acid dissolved in an inert solvent with said solution optionally containing less than 20% by weight of acetic acid;

continuously blowing into said one end of said reaction system bubbles of propylene gas at a pressure in the range of 3 to 50 kg./sq. cm. gauge, with the mol ratio of propylene to peracetic acid fed into said reaction system being in the range of 1:1 and 6:1;

continuously flowing the peracetic acid solution and the propylene gas bubbles in concurrent flow relationship through the reaction system with the flow rate of the peracetic acid solution being less than a Reynold number of 2000 and the superficial gas velocity of the propylene bubbles being in the range of 0.05-50 cm./sec.;

the reaction system comprising a series of reaction zones through which the solution and gas bubbles flow in series, the reaction zones being separated by perforate members with the perforations thereof having a diameter in the range of 2 to 10 mm. and the sum of the areas of the perforations in each member divided by the total surface area of the member being in the range of 1% to 20%, whereby the peracetic acid solution and the propylene gas flow through the reaction system in a laminar flow state without substantial back mixing and the propylene bubbles are redispersed in the peracetic acid solution following passage through the perforate members;

the temperature in the reaction system being maintained in the range of 30° C. to 80° C. and the mean residence time of the peracetic acid solution and propylene bubbles in the reaction system being in the range of 30 to 180 minutes; and obtaining from the other end of the reaction system a liquid reaction product containing propylene oxide.

2. A process as claimed in claim 1 wherein said reaction system is composed of one reaction column divided into a plurality of reaction zones by a plurality of perforated plates.

3. A process as claimed in claim 1 wherein said reaction system is composed of a plurality of reaction columns each divided into a plurality of reaction zones by perforated plates.

4. A process as claimed in claim 1 wherein said reaction system is composed of a plurality of reaction columns each of which constitutes a single reaction zone.

5. A process as claimed in claim 1 wherein said organic solvent for peracetic acid is a mixture of acetic acid and ethyl acetate.

6. A process as claimed in claim 1, in which the peracetic acid solution contains from 20 to 45% by weight of peracetic acid, the mol ratio of propylene to peracetic acid is in the range of 1.2:1 to 5 to 1, the temperature of the reaction system is in the range of 40 to 70° C., the mean residence time is in the range of 60 to 150 minutes, the diameter of the perforations is in the range of 4 to 6 mm. and the sum of the areas of perforations divided by the total surface area is in the range of 5 to 15%.

7. A process as claimed in claim 3, in which the unreacted propylene gas is removed from the reactants at the top of each column and bubbles of propylene gas are blown in the bottom of each column.

References Cited

UNITED STATES PATENTS

| | | | |
|---|---|---|---|
| 2,878,108 | 3/1959 | Chandler | 260—687 X |
| 3,173,947 | 3/1965 | Benning et al. | 260—687 X |
| 3,228,977 | 1/1966 | Sennewald et al. | 260—348.5 |

FOREIGN PATENTS

| | | | |
|---|---|---|---|
| 900,836 | 7/1962 | Great Britain | 260—348.5 |
| 1,519,147 | 2/1968 | France | 260—348.5 |

OTHER REFERENCES

H. Kolbel et al.: Chemiker-Ztg./chem. Apparatur, vol. 92 (16) (August 1968), pp. 581–590.

NORMA S. MILESTONE, Primary Examiner

U.S. Cl. X.R.

23—283, 285